United States Patent [19]

Colditz et al.

[11] Patent Number: 4,691,229
[45] Date of Patent: Sep. 1, 1987

[54] APPARATUS FOR CHECKING COLOR PICTURES ON A COLOR MONITOR

[75] Inventors: Armin Colditz, Kiel; Siegfried Klopsch, Probsteierhagen, both of Fed. Rep. of Germany

[73] Assignee: Dr. Ing. Rudolf Hell GmbH, Fed. Rep. of Germany

[21] Appl. No.: 734,265

[22] PCT Filed: Sep. 8, 1984

[86] PCT No.: PCT/DE84/00185
§ 371 Date: May 6, 1985
§ 102(e) Date: May 6, 1985

[87] PCT Pub. No.: WO85/01408
PCT Pub. Date: Mar. 28, 1985

[30] Foreign Application Priority Data

Sep. 10, 1983 [DE] Fed. Rep. of Germany ....... 3332791

[51] Int. Cl.⁴ ............................ H04N 1/46; G03F 3/10
[52] U.S. Cl. ........................................ 358/76; 358/78; 358/80
[58] Field of Search .................. 358/76, 78, 80, 75

[56] References Cited

U.S. PATENT DOCUMENTS

| 3,725,574 | 4/1973 | Gast | 358/298 |
| 4,285,009 | 8/1981 | Klopsch | 358/76 |
| 4,393,399 | 7/1983 | Gast et al. | 358/80 |
| 4,464,677 | 8/1984 | Kuhn et al. | 358/78 X |
| 4,476,487 | 10/1984 | Klie et al. | 358/80 |
| 4,486,772 | 12/1984 | Klie et al. | 358/80 |
| 4,516,155 | 5/1985 | Hennig et al. | 358/78 X |
| 4,577,219 | 5/1986 | Klie et al. | 358/78 |

FOREIGN PATENT DOCUMENTS

| 2607623 | 1/1977 | Fed. Rep. of Germany . |
| 0147813 | 7/1985 | Fed. Rep. of Germany ........ 358/80 |
| 2077548 | 12/1981 | United Kingdom . |

Primary Examiner—Michael A. Masinick
Assistant Examiner—E. Anne Toth
Attorney, Agent, or Firm—Hill, Van Santen, Steadman & Simpson

[57] ABSTRACT

Apparatus for checking or, respectively, correcting a color picture to be printed on a monitor, whereby reference colors stored for color checking by means of a coordinate acquisition means can be made visible in a reference color field at abitrary locations of the color picture.

4 Claims, 7 Drawing Figures

| DECIMAL | BINARY $2^5\ 2^4\ 2^3\ 2^2\ 2^1\ 2^0$ | OUTPUT A |
|---|---|---|
| 0 | L L L L L L | L |
| 1 | L L L L L H | L |
| 2 | L L L L H L | L |
| 3 | L L L L H H | L |
| 7 | L L L H H H | L |
| 8 | L L H L L L | L |
| 15 | L L H H H H | L |
| 16 | L H L L L L | L |
| 17 | L H L L L H | L |
| 18 | L H L L H L | H |
| 19 | L H L L H H | H |
| 20 | L H L H L L | H |
| 21 | L H L H L H | H |
| 22 | L H L H H L | L |
| 23 | L H L H H H | L |
| 63 | H H H H H H | L |
|  | 0 1 2 3 4 5 6 7 |
|---|---|
| 0 - 7 | L L L L L L L L |
| 8 - 15 | L L L L L L L L |
| 16 - 23 | L L H H H H L L |
| 24 - 31 | L L H H H H L L |
| 32 - 39 | L L H H H H L L |
| 40 - 47 | L L H H H H L L |
| 48 - 55 | L L L L L L L L |
| 56 - 63 | L L L L L L L L |
REFERENCE E COLOR FIELD
*Fig. 5*
*Fig. 7*
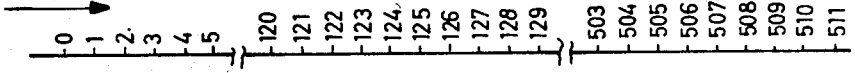
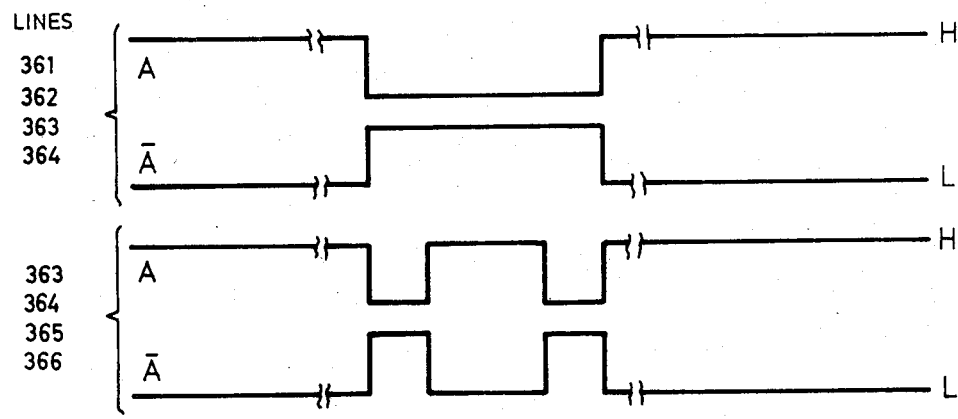

APPARATUS FOR CHECKING COLOR PICTURES ON A COLOR MONITOR

BACKGROUND OF THE INVENTION

1. Field of the Invention

The present invention relates to a facility for checking or, respectively, for correcting color pictures on a color monitor according to the preamble of patent claim 1.

2. Description of the Prior Art

A color viewing device with which an image to be printed can be displayed, corrected and evaluated is already disclosed by the DE-AS No. 26 07 623 (U.S. Pat. No. 4,285,009). U.S. Pat. No. 4,393,399 corresponds to PCT-OS No. 80/02607 U.S. Pat. Nos. 4,285,009 and 4,393,399 are hereby incorporated by reference. Extensive image corrections can be undertaken with this apparatus and therewith achieved is that the picture displayed on the color monitor and potentially corrected comes as close as possible to the final printing result, i.e. to the picture as it later appears when printed. An objective image evaluation is required for this purpose. This is only possible when the operator, in addition to the more or less subjective visual image impression, has possibilities which allow binding, reproducible statements. Measuring the colors is, for example, such a means. A cursor mixed into the image is thereby moved to the picture detail to be measured and the corresponding color values are read at, for example, a measuring instrument or these color values are mixed in at the margin of the picture. The corresponding printing ink for these color values can then be identified in a color atlas and this reference color is compared to the picture screen. This method is not optimum since it is time-intensive and not reliable in evaluation, for the eye becomes insensitive given a greater distance between the colors to be evaluated or, respectively, compared.

Further, errors can occur due to unfavorable lighting and a colored surround field of the color to be evaluated.

Further known in the evaluation of color pictures is to make reference colors visible on the color monitor at the margin of the picture. This type of evaluation is likewise still faulty since the chromatic impression of the picture element to be evaluated or of the picture detail to be evaluated is influenced by the surrounding colors and there is a distance from the reference color fields.

SUMMARY OF THE INVENTION

It is therefore the object of the present invention to specify a facility with which an even better evaluation of the colors in the picture is enabled.

The invention achieves this by means of the features recited in the characterizing part of claim 1. Advantageous improvements are described in the sub-claims 2-4.

BRIEF DESCRIPTION OF THE DRAWINGS

The invention shall be explained in greater detail below with reference to the FIGURES.

Shown therein are:

FIG. 5 a memory fill for the example of FIG. 2;

FIG. 7 a clock pattern for the RAM memory.

DESCRIPTION OF THE PREFERRED EMBODIMENTS

Figure 1:
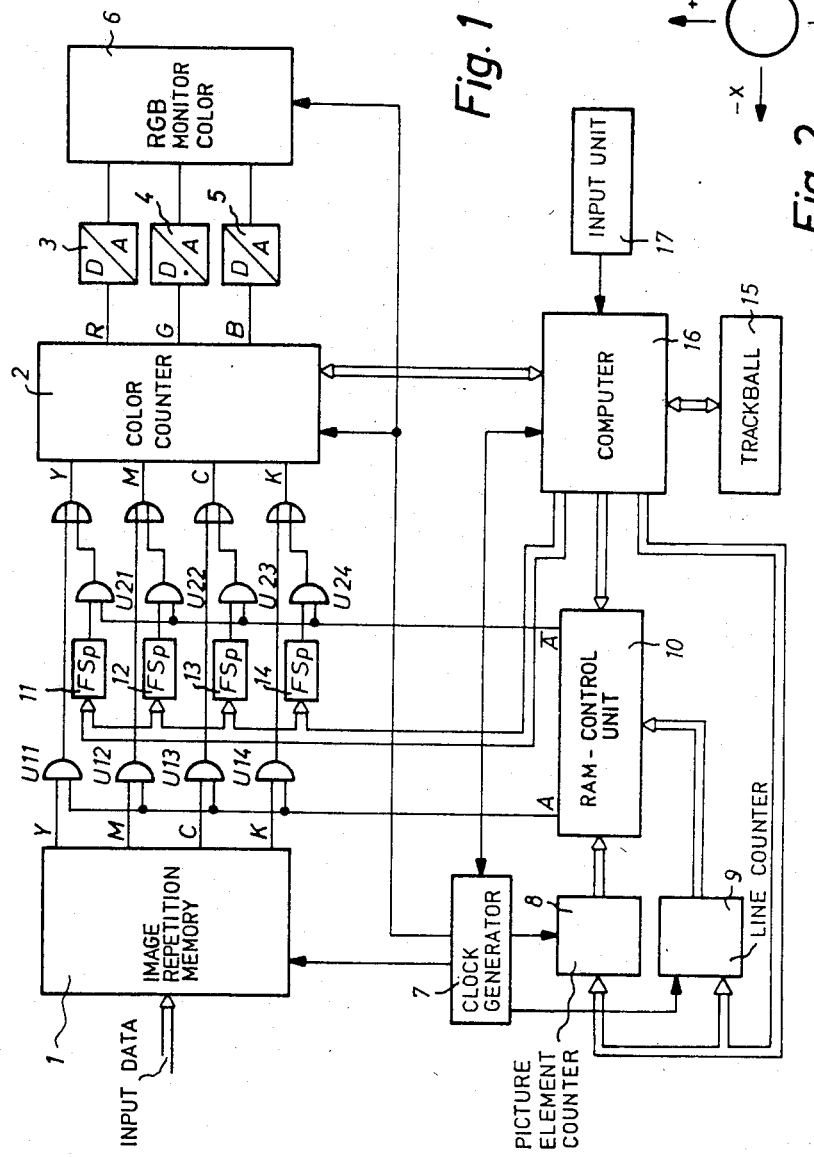
FIG. 1 a fundamental circuit diagram of the facility.

An image repetition memory (1) is provided in FIG. 1, this comprising an image data input via which the printing ink signals of the picture to be displayed which were identified by a scanner in a preceding process have been input. The image scanning by means of such scanners is general prior art. The scanner Type DC 300 of Dr.-Ing. Rudolf Hell GmbH, Kiel, Germany is referenced in this context This scanner has been in worldwide use long before the date of filing, see for example the company publication of Dr.Ing. Rudolf Hell GmbH, "Chromagraph DC 300", No. 300-8-7703 (984) of 1977 or the German Letters Patent No. 21 07 738 or, respectively, the U.S. Pat. No. 3,725,574 which is hereby incorporated by reference. The image signals generated by means of this scanner are digitized into the standard codes employed for the image signals. This coding, however, is not of decisive significance for the image display described below; the only thing required for the further processing of these digital image signals is that a digital image signal value and an address corresponding to the respective scan position are allocated to every picture element.

These image signals, as already mentioned, are digitized and, in the normal case, proceed via four signal paths for the printing inks Y,M,C and K to a color converter (2) which simulates the printing process. The color converter (2) generates tri-chromatic signals R,G,B from the printing ink signals Y,M,C and K, these proceeding via digital-to-analog converter (3, 4 and 5) to a color monitor (6). Also provided in the signal path between the image repetition memory (1) and the color converter (2) are gates $U_{11}$, $U_{12}$, $U_{13}$, and $U_{14}$, by means of which the signals of the image repetition memory (1) can be connected through to the color converter (2). Synchronously with the frame frequency of the monitor (6), the image repetition memory (1) generates output signals Y,M,C, and K which, after traversing the color converter (2), appear as a stationary picture on the monitor (6). Image repetition memory (1), color converter (2) and monitor (6) are connected to a common clock generator (7) which generates the clocks for the read-out of the image repetition memory (1), for the transfer of the image signal values through the color converter (2) and for the monitor control, i.e. generates the corresponding synchronization signals.

A picture element counter (8) in which the picture elements of a line are respectively counted from the beginning of the line is connected to the clock generator. A line counter (9) which co-counts the number of lines respectively read out for every image read out is also connected to the clock generator (7). These counters are connected via a bus to the computer (16), via which bus the counters can be set proceeding from the computer (16). Picture element counter (8) and line counter (9) are also connected to a control unit (10) which has two outputs A and $\overline{A}$. The output A is connected to the gates $U_{11}$–$U_{14}$. The color picture becomes visible on the color monitor (6) when the AND gates $U_{11}$–$U_{14}$ are activated by the control signal A, i.e. when this control signal is high.

Figure 2:
FIG. 2 an illustration of the directional coordinates that are generated by means of a "trackball"

Four color memories (11, 12, 13 and 14) are also provided, these being connected via gates $U_{21}$, $U_{22}$, $U_{23}$ and $U_{24}$ to the color converter input. These gates $U_{21}$–$U_{24}$ are connected to the output $\overline{A}$ of the control unit (10). In case the control signal at the output A switches to L, the gates $U_{11}$–$U_{14}$ are inhibited, i.e. the image information coming from the image repetition memory is suppressed. Since the corresponding, inverted signal lies on the line A, the AND gates $U_{21}$–$U_{24}$ are conductive as a result of the $\overline{A}$-signal supplied to them, so that the color information in the color memories (11–14) proceed to the color converter (2) and, thus, to the monitor (6). Also provided is a device for coordinate prescription (15) which comprises a coordinate acquisition means (trackball) which is movable across the surface of the monitor (6). The coordinates respectively prescribed by the coordinate acquisition device (15) are thereby identified and offered. FIG. 2 shows the coordinates that are generated with the coordinate acquisition device (15) of FIG. 1. Such coordinate acquisition devices are generally known and are commercially available, for example "Trackball" Type TBS II-500-ALD-5-1 of the Litton Company, U.S.A. This device has four signal outputs +x, −x, +y, −y as shown in FIG. 2. Pulses are obtained at these signal outputs dependent on the rotational sense of the ball of the trackball. Upon rotation in diagonal direction, pulses are simultaneously obtained at the two corresponding signal outputs. The number of pulses is proportional to the rotational angle and the pulse repetition frequency is proportional to the rotational speed.

Figure 3:
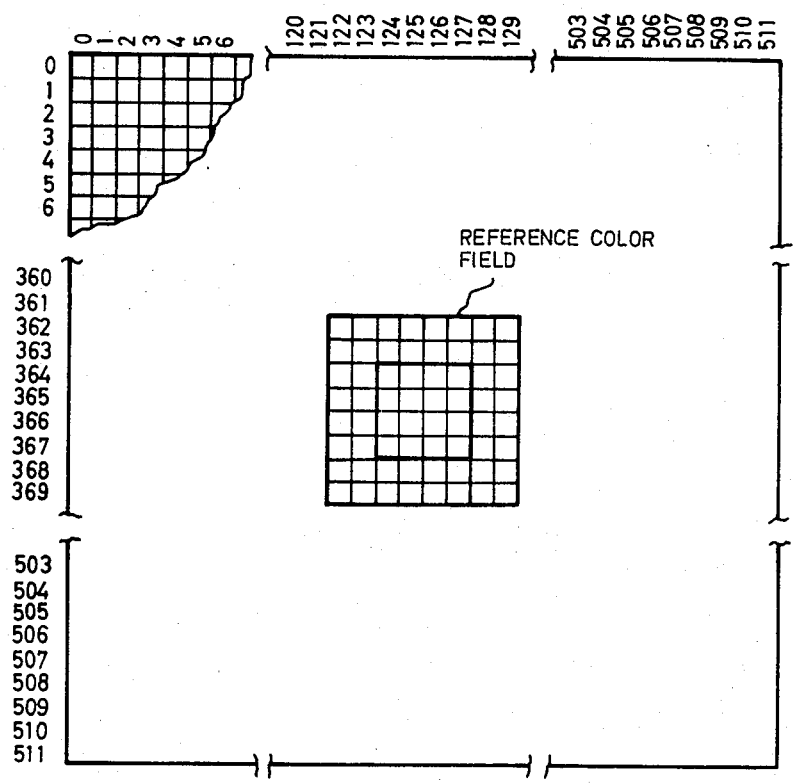
FIG. 3 an illustration of a reference color field on the monitor screen.

Via the control unit (10) of FIG. 1 in combination with the two counters (8 and 9) for the picture elements and image lines, the control of the gates $U_{11}$–$U_{14}$ as well as of the gates $U_{21}$–$U_{24}$ can ensue such that the color signals situated in the color memories (11–14) can be displayed on the monitor (6) on the picture screen dependent on the coordinates respectively indicated by the coordinate acquisition device (15) in a region around these coordinates. Outside of this region, the information stored in the image repetition memory (1) and output therefrom is displayed. FIG. 3 shows an example of such a reference color field on the monitor (6) of FIG. 1. Let the picture screen have a resolution of $512 \times 512$ picture elements. In this case, the image repetition memory (1) also comprises the corresponding resolution, i.e. $512 \times 512$ memory locations or, respectively, 512 X-addresses and 512 Y-addresses. In this example, the reference color field is a frame. The picture again appears in the inside of the frame. The frame can also be broader and the color field larger. The size has been shown small here only for the sake of an understanding. The reference color is displayed in the region of the shaded surface. A computer (16) with an input unit (17) is also provided in FIG. 1, this being connected to the control unit (10), to the coordinate acquisition device (15), to the counters (8) and (9) as well as to the color memories (11–14) and the color converter (2). The computer (16) is coupled to the clock generator (7), so that corresponding instructions can be forwarded from the computer (16) synchronized with the clock system of the image display facility. The input unit (17) is provided for inputting the reference colors as well as the shape of the reference color field. The color converter (2) can also be switched over for other printing processes by means of the computer (16). For example, a microprocessor Type 8086 of Siemens AG can be employed as the computer (16) and the RAM control unit (10) can be constructed of memories Type HM 6148 of Hitachi. The RAM control unit supplies the pulses for the size and shape of the reference color field, as already mentioned in conjunction with FIG. 3.

The fundamental execution of the representation and movement of the reference color field is as follows:

At the beginning, the reference color memories (11–14) and the RAM control unit (10) are provided with a standard fill. The picture element and line counters (8, 9) have likewise received starting numbers. The operator now undertakes the following operations:

(a) Switching the reference color field on and off.

(b) Selecting the shape and size of the reference color field. The RAM control unit is correspondingly loaded.

(c) Changing the color. The reference color memories (11–14) are correspondingly reloaded.

Figure 6:
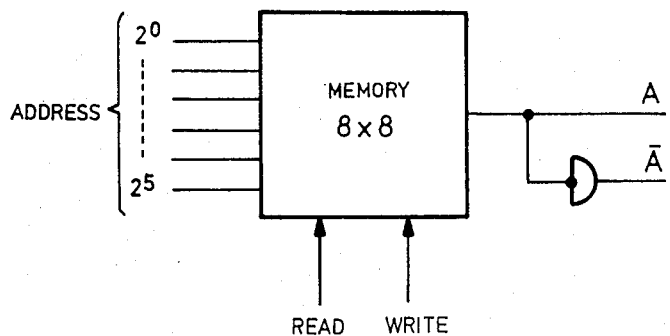
FIG. 6 an example for the memory of the RAM control unit.

The operator can move the reference color field with the trackball (15). For this purpose, the computer (16) must continuously count the output pulses from the trackball and correspondingly recalculate the counter starting numbers additively or subtractively. After every image start, these new counter starting numbers are written into the registers of the counters. In order to now generate a reference mark in the color picture, it must be seen to that the A-signal of the RAM control unit has LOW status and $\overline{A}$ has HIGH status at the corresponding picture elements where the reference mark should be visible. A corresponding filling in the memory of the RAM control unit (10) takes care of this. This filling is transmitted thereto from the computer (16). When the size or shape of the reference color field is to be changed, a correspondingly modified filling is transmitted from the computer. FIG. 5 indicates an example of a reference color field which is formed of $8 \times 8$ picture elements and contains the original image in the center in a field of $4 \times 4$ picture elements. At those locations at which the reference color is to be displayed, the A-signal is at L. When the A-signal is at H, then the original color picture is displayed. This reference mark is shown in the right-hand part of FIG. 5; the left-hand part of FIG. 5 shows the corresponding memory fill which leads to the display of this mark. This memory fill is stored in a memory that is shown in FIG. 6. The left-hand part of FIG. 5 indicates the allocation of the output values of the memory of FIG. 6 to the corresponding input addresses 0–63. The addresses, for example 0–7; 8–15 16–23 . . . , which supply the corresponding L and H signals of this line are additionally indicated at the individual lines of the reference mark of FIG. 5.

The clock pattern of the RAM control unit (10) required for this purpose is shown in FIG. 7. After picture element 121, the A-signal is at L and is again at H after picture element 128. The $\overline{A}$-signal is correspondingly inverted. These signal curves of the upper part of FIG. 7 apply to the lines 361, 362, 367 and 368 of FIG. 3. The signal curves for the lines 363 through 366 of FIG. 3 are indicated in the lower part. A comparison of the reference color field of FIGS. 2 and 5 to these signal curves shows that the upper signal curve is valid for the lines of the reference color field which only display the reference color and the lower curve is valid for the region of the refernce color field in the center where the color picture still appears.

Valid for all of the lines outside of the reference mark are:

A=const=H
$\overline{A}$=const=L

Figure 4:
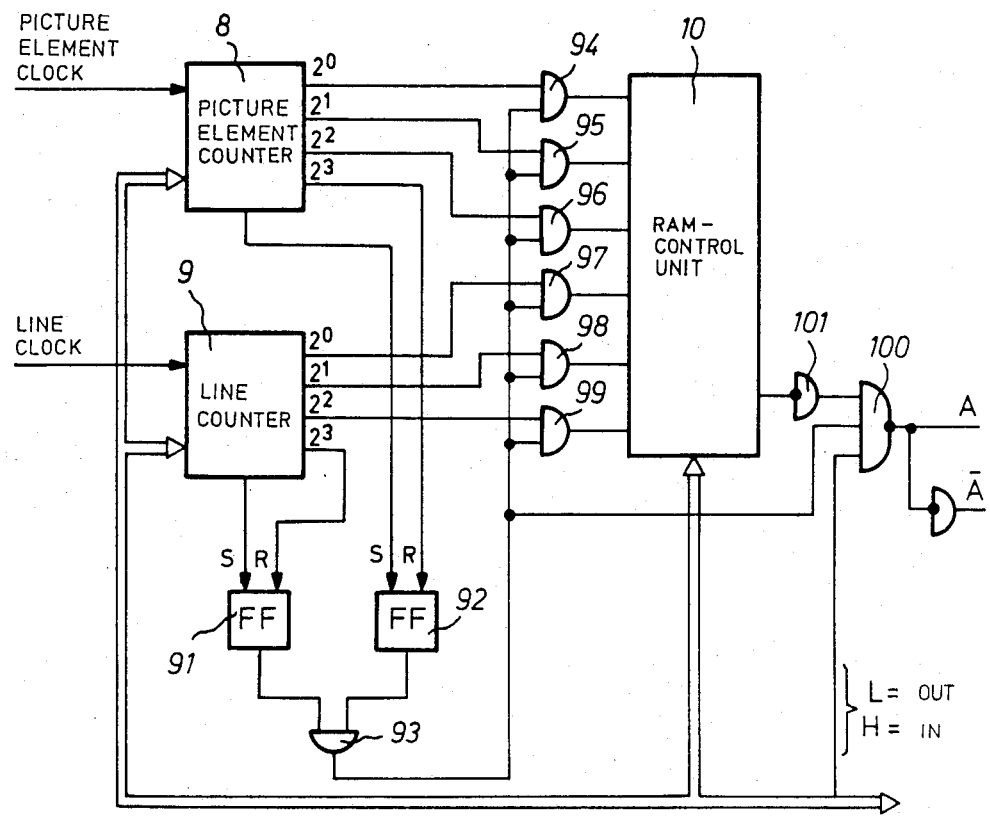
FIG. 4 a circuit for the drive of the RAM control unit.

The memory of the RAM control unit (10) receives a memory fill which generates this clock pattern, the memory shown in FIG. 6 having 8×8 bits, i.e. an address capacity of 6 bits, serving this purpose. As already mentioned, the left-hand part of FIG. 5 represents the corresponding truth table. It is often desirable in practice to design the reference color field substantially larger, to which end a larger memory with a corresonding fill is simply selected instead of the memory of FIG. 6; the principle, however, remains the same. In order to move this reference color field in the color picture, a corresponding counter reading of the counters (8) and (9) is defined and modified in accord with the coordinates supplied by the trackball (15). To this end, the counters (8) and (9) are connected to the RAM control unit (10) and to the computer (16), this being clear from FIGS. 1 and 4. FIG. 4 shows the specific connection of the counters to the RAM control unit for generating the corresponding A and $\overline{A}$ signals. The counters 8 and 9 are followed by flipflops 91 and 92 whose outputs are connected to a common gate 93 whose output proceeds to a 6-fold AND gate 94–99 as a switch line. Respective halves of the 6-fold AND gate lie at three output lines $2^0$, $2^1$ and $2^2$ of the counter 8 and at three respectively corresponding output lines $2^0$, $2^1$ and $2^2$ of the line counter 9. The respectively highest output line, i.e. $2^3$, respectively lies at the flipflop 91 or, respectively, 92. After an AND operation, the outputs of the flipflops (91) and (92) control the gates (94–99) as well as a gate (100) which comprises three inputs. The first input is the output of the RAM control unit (10) which is connected via an inverter (101). This inverter is provided so that the output signal of the RAM control unit (10) is considered with the correct value at the AND gate (100). The input of the gate (100) which comes from the computer (16) serves as an on-off switch for the function "reference color field", i.e. A is at H level as long as this signal is at L level and the color picture is through-connected independently of any output signals of the RAM control unit. The gates (94–99) are only through-connected when both flipflops are set i.e. are H; the gate (100) is correspondingly conductive. Let it also be mentioned that the counters (8) and (9) are standard, commercially available components, for example counters Type 74 HC 593 of National Semiconductor Corp. These counter modules have an input register into which a counter starting number can be written via the data bus of the computer. The conters then begin to count proceeding from this number. As soon as the counters count until full, they supply pulses with which the RAM control unit can be started. Specifying a manufacturer for the remaining components of FIG. 4 is unnecessary since they are commercially available components offered by many manufacturers.

The function sequence shall now be explained further. In the example of FIGS. 3 and 5, the reference color field begins at picture element 121 and at line 361. At this point in time, the two counters are both just residing at start, i.e. all bits are LOW, this corresponding to the first address of the RAM control unit. So that the counters are just then residing at LOW, they are filled with a starting number 511−120=391 for the picture element counter and 511−361=150 for the line counter. When a counter reaches its final reading, i.e. when all outputs are at HIGH, then this counter supplies a pulse at output line (S). This sets a flipflop. When both flipflops are set, this means that the last picture element before the beginning of the reference field has just been counted.

By AND combination of the two flipflop outputs, the address is connected from the counter through to the RAM control unit via a 6-fold AND gate and, in addition, the output of the RAM control unit is enabled. A=constant HIGH applied previously The RAM control unit is now read out with the next 8 picture elements. When the address changes from HHH to LLL, the next-higher counter output $(2^3)$=H and switches the flipflop (92) back. The output A is thus set to H again. In the line return phase, the picture element counter is started again by the computer and in defined fashion, so that the horizontal counting operation starts again.

The operation is determinated when the line counter also exceeds the address HHH and resets the flipflop (91) via the output $2^3$. The operation can only now begin again with a new image start. The counter starting numbers will then change from picture to picture when the trackball (15) is turned in order to shift the reference color field. In accord with the pulses +x or −x or, respectively, +y or −y of FIG. 2, the starting numbers will be higher orlower, this resulting in a movement of the reference color field.

The invention is advantageously employed when a chromatic picture section within a color picture is to be corrected to a specific, prescribed color value. To this end, the reference color field can either be placed in the color field and the correction of the color can be modified until the reference color field is no longer visible, or the reference mark can be placed immediately next to the color to be corrected so that a direct comparison without influence from other colors is possible. The correction itself can be undertaken by means of a commercially available scanner for the image data input into the image repetition memory, whereby color correction means present at the scanner is employed, or it can also be executed by means of the color correction device of the color viewing means itself such as disclosed, for example, in DE-AS No. 26 07 623 which corresponds to U.S. Pat. No. 4,285,009. The printing ink signals situated in the image repetition memory are then directly modified proceeding from the scanner or by the correction unit of the color viewing means. The field of the reference color can preferably be square having, for example, a size of abut 2×2 cm². However, any of the shape and size can also be selected, for example, as already mentioned, as a movable frame which surrounds the color to be corrected. With the assistance of the input means (17) of the computer (16), it is possible to elect various reference colors with an identifier number. Operation is thereby substantially simplified and a comparison of juxtaposed color samples of different reference colors can be easily and quickly executed.

The tinting of the reference field can also inventively occur in the measured color values which are identified from a picture location to be corrected are displayed as the color in the reference field. When, for example, a small color area is to be checked for chromatic exactness, this location is approached with a cursor, the color values are measured and it is possible with the assistance of the computer to convert these measured values directly into the reference color, so that the corresponding color becomes visible in the significantly larger reference color field. This auxiliary possibility can also be inventively employed for keeping a palette of reference colors ready at, for example, the lower margin of the picture. When one of these fields is then approached with the measuring mark, then the reference color field can be correspondingly tinted and a more convenient color inputting for the reference field is available than, for example, the inputting by the input means via the identifier number.

We claim:

1. Apparatus for displaying a color picture on a color monitor, comprising, an image repetition memory (1) for generating a stationary image on a monitor (6) and containing the printing ink signals Y, M, C, K of the picture to be represented; a color converter (2) which is connected between the image repetition memory (1) and the monitor (6) in order to convert the four printing ink signals Y, M, C, K into three color signals R, G, B for the drive of the monitor (6); a clock generator (7) for generating read signals for the image repetition memory (1) and signals for the synchronization of the image repetition memory, color converter and monitor; color memories (11-14) into which freely selectable ink colors can be input as reference colors, whereby the color memories (11-14) and the outputs of the image repetition memory (1) are connected via gate circuits ($U_{11}$-$U_{24}$) to the input of the color converter (2); a coordinate acquisition device (15) for selecting coordinates on the monitor (6); a picture element counter (8) connected to the clock generator (7) by means of which the image signals within the individual lines are counted; a line counter (9) which is connected to the clock generator (7) and by means of which the lines of every individual image are counted; and comprising a control unit (10) which is connected to a computer (16) by means of which the control unit is loaded to the gate circuits ($U_{11}$-$U_{24}$), to the picture element counter (8), to the line counter (9) as well as, via the computer (16), to said coordinate acquisition (15) device for selecting coordinates on a monitor, to the color converter (2) and to an input unit (17), whereby the control unit (10) generates control signals for the gate circuit ($U_{11}$-$U_{24}$) from the respective coordinates of the device for coordinate acquisition and the two counters (8, 9), these control signals defined, by switching from the image repetition memory (1) to the color memories (11-14) or, respectively, vice versa, that the reference color input into the color memories (11-14) is switched to the color converter (2) by the gate circuit ($U_{11}$-$U_{24}$) instead of the output signals of the image repetition memory (1) in a region around the coordinate respectively called in by said coordinate acquisition device.

2. Apparatus according to claim 1, characterized in that the color memories ($U_{14}$-$U_{24}$) are connected to the computer, whereby the reference colors as well as the size and shape of the reference field are forwarded into the computer by the input means and the color memories are loaded proceeding from the computer.

3. Apparatus according to claim 2, characterized by its employment in conjunction with a color correction apparatus for prescribing the color correction of prescribed color.

4. Apparatus according to claim 2, characterized in that a measuring mark freely movable on the monitor picture screen (6) is provided and in that the reference color of the color memories (11-14) are settable to the color values identified by the color measuring mark.

* * * * *